May 30, 1939.  F. W. SCHWINN  2,160,035
BICYCLE FRONT FORK STRUCTURE
Filed March 3, 1938  3 Sheets-Sheet 1
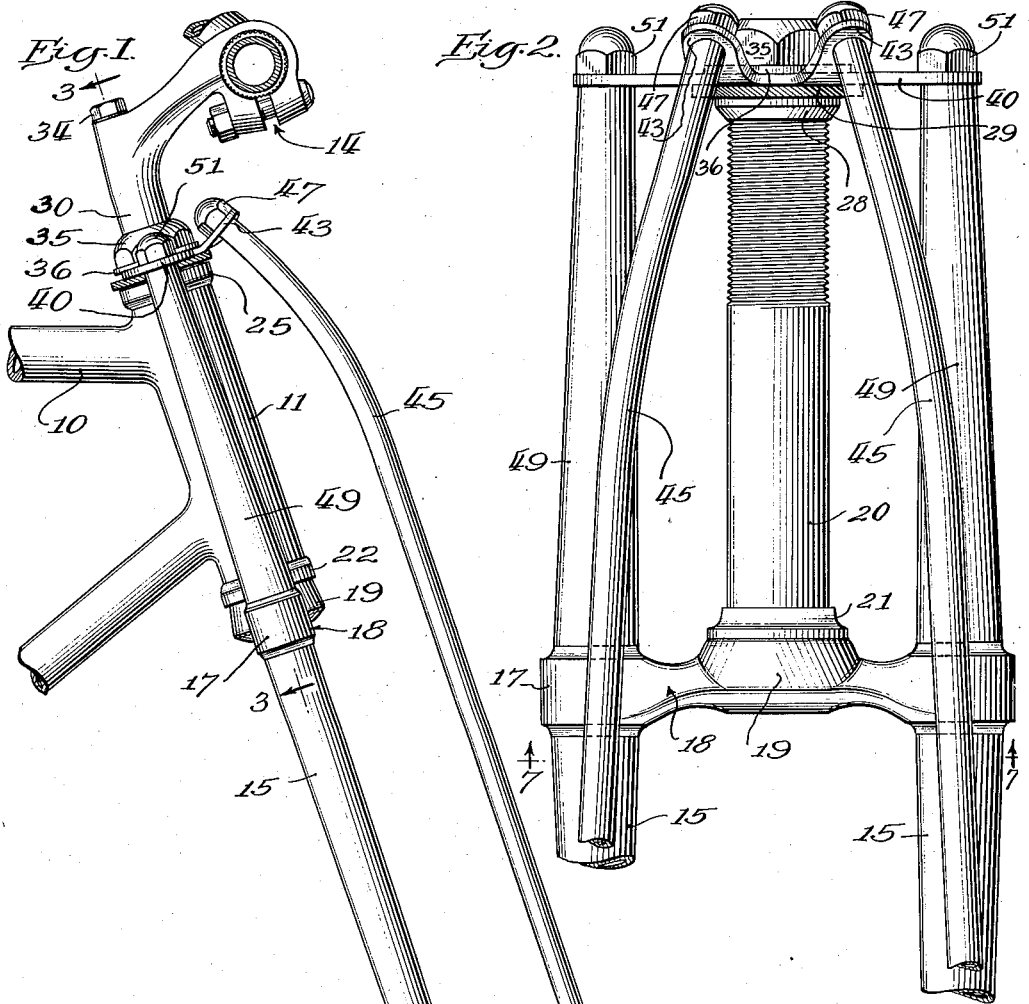
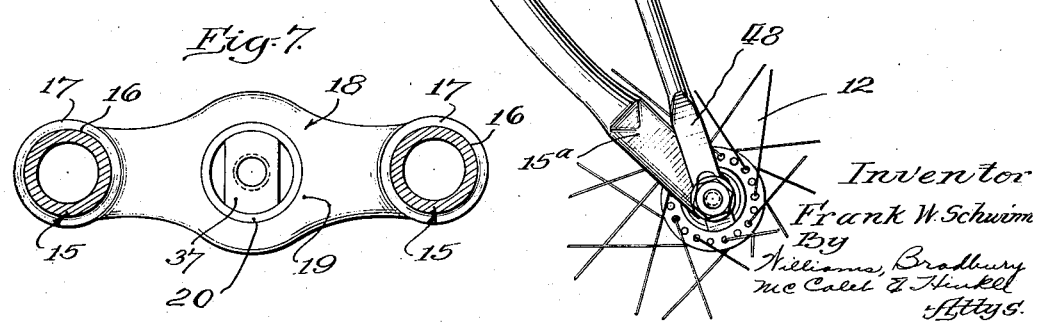
Inventor
Frank W. Schwinn
By
Williams, Bradbury,
McCaleb & Hinkle
Attys.

May 30, 1939.   F. W. SCHWINN   2,160,035
BICYCLE FRONT FORK STRUCTURE
Filed March 3, 1938   3 Sheets-Sheet 2
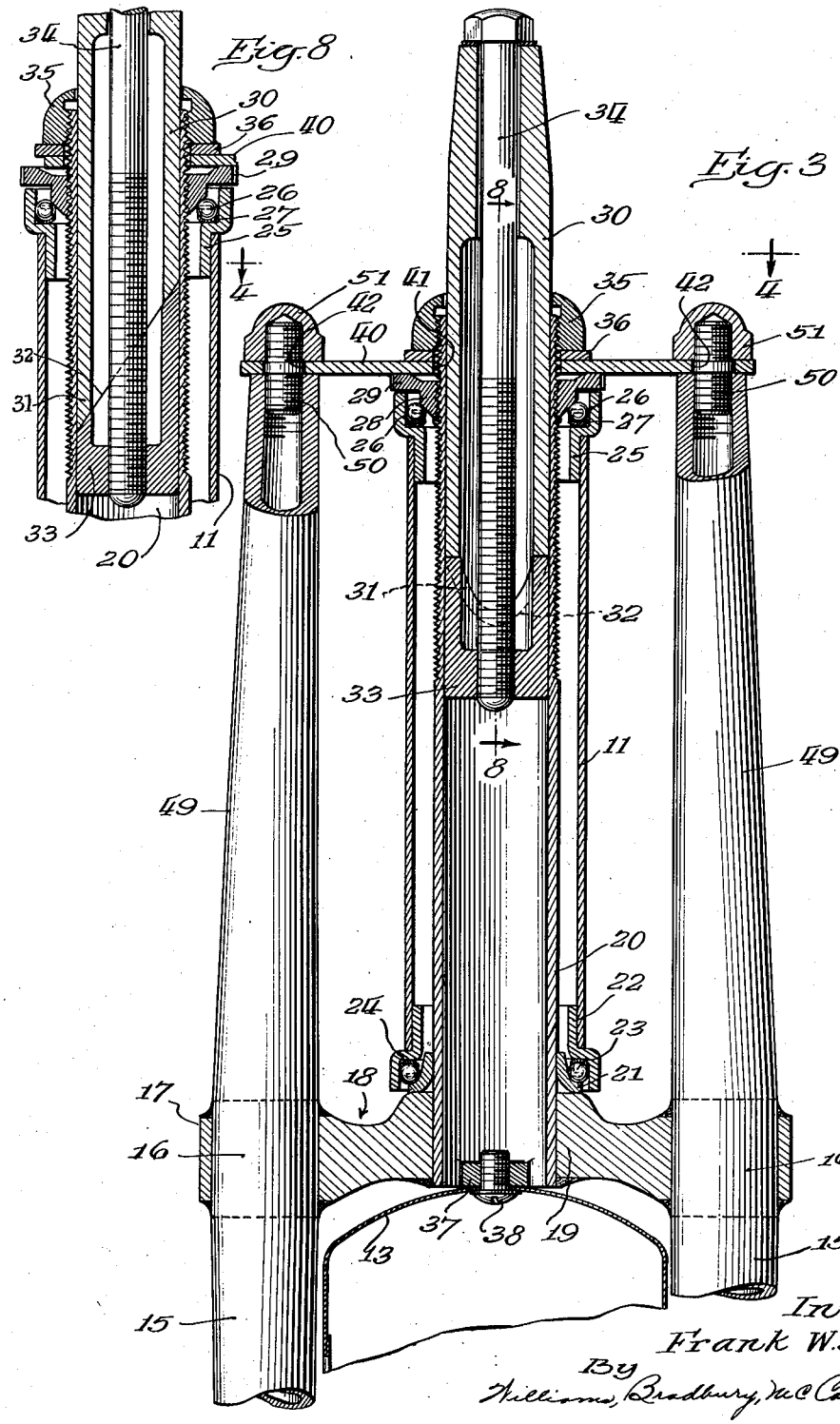
Inventor.
Frank W. Schwinn
By
Williams, Bradbury, McCaleb & Hinkle
Attys.

May 30, 1939.    F. W. SCHWINN    2,160,035
BICYCLE FRONT FORK STRUCTURE
Filed March 3, 1938    3 Sheets-Sheet 3
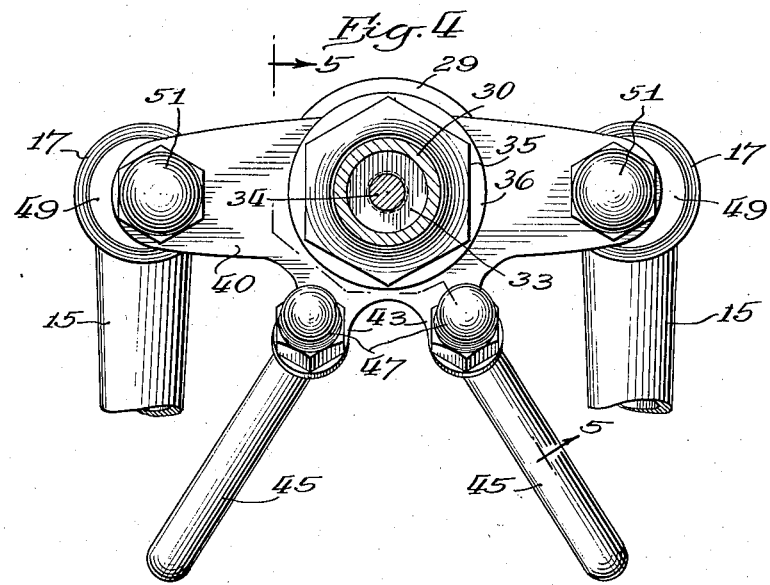
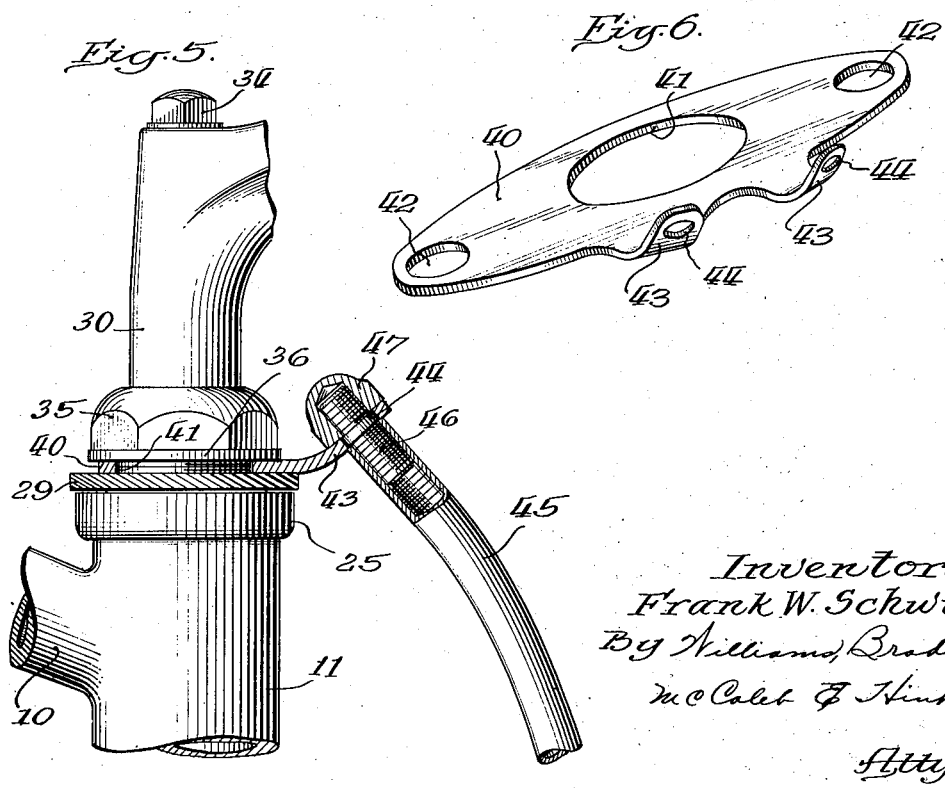
Inventor:
Frank W. Schwinn Patented May 30, 1939

2,160,035

UNITED STATES PATENT OFFICE 2,160,035

BICYCLE FRONT FORK STRUCTURE

Frank W. Schwinn, Chicago, Ill.

Application March 3, 1938, Serial No. 193,679

1 Claim. (Cl. 280—279)

My invention contemplates and provides a bicycle front fork structure which is superlatively strong and which owes its great strength to certain novel features of construction which improve it esthetically and in no wise interfere with the complete adjustability of its associated handle bar unit.

The conventional bicycle front fork structure comprises a pair of fork members which, at their lower ends, are operatively associated with the axle of an embraced front wheel and which, at their upper ends, are connected by a crown from which rises a stem which is rotatably received in the steering head of the associated bicycle frame and, in turn, is operatively connected with a handle bar unit. A very common ailment of such conventional front fork structures is a bending of the fork stem, in consequence of overload, out of its appropriate relationship to the crown.

The primary object of the present invention is so to strengthen a bicycle front fork structure as to prevent development of the ailment just mentioned, and a secondary object is to accomplish the primary object by an arrangement of parts which materially improves the appearance of the bicycle and does not in any way impair the adjustability of the handle bar unit with which the strengthened front fork structure is associated.

The foregoing and other features, objects and advantages of my invention will appear from the ensuing detailed description, wherein reference is made to the accompanying drawings, in which:

Fig. 1 is a side elevational view of the front fork structure of the present invention in operative relation to fragments of a bicycle frame, handle bar and front wheel;

Fig. 2 is a front elevational view of the upper portion of the front fork structure as it appears when disassociated from other parts of the bicycle of which it forms a part;

Fig. 3 is a front view which, so far as its sections are concerned, may be regarded as taken substantially in the plane of the line 3—3 of Fig. 1 and looking in the direction indicated by the arrows;

Fig. 4 is a top view, which, in so far as its sections are concerned, may be regarded as taken in the plane of the line 4—4 of Fig. 3;

Fig. 5 is a side view, partly in section, of the upper parts of the front fork structure in operative relation to fragments of the steering head and handle bar unit;

Fig. 6 is a perspective of a dual purpose plate which is a salient feature of the present invention;

Fig. 7 is a horizontal sectional view which may be regarded as taken in the plane of the line 7—7 of Fig. 2 and looking upwardly as indicated by the arrows; and Fig. 8 is a fragmentary sectional view which may be regarded as taken in the plane of the line 8—8 of Fig. 3 and looking in the direction indicated by the arrows.

Similar characters of reference refer to similar parts throughout the several views.

In the drawings, reference numeral 10 denotes the frame of a bicycle having a steering head 11. A portion of the front wheel of such bicycle is shown at 12 in Fig. 1. At 13 in Fig. 3 is shown a fragment of a conventional mud guard which may derive a part of its support from the front fork structure. A suitable handle bar unit is indicated as a whole at 14.

The front fork structure comprises a pair of fork members 15, preferably tubular, which are disposed in substantial parallelism. Such fork members have maximum diameter portions 16 which, by welding or otherwise, are held firmly in the embrace of collars 17. These collars 17 are integral parts of a rugged three collar fitting 18, the third or intermediate collar of which is indicated at 19. Welded, or otherwise firmly held in collar 19, is the lower end of a fork stem or steering tube, designated at 20. Fitting 18 corresponds generally with the crowns of conventional front fork constructions. The lower ends of fork members 15 are flattened, as at 15a, and are slotted or otherwise conformed for cooperation with the axle of the front wheel 12.

The fork stem or steering tube 20 extends upwardly through steering head 11 in which it is provided with combination radial and thrust bearings. The lower bearing comprises bearing cone 21, two diameter sleeve 22, and a series of balls 23 carried in a suitable retainer 24. The upper bearing comprises two diameter sleeve 25, the series of balls 26 in retainer 27, and the bearing cone 28,—such cone 28 conveniently being an integral portion of a ring nut 29 which is threaded upon the upper end of stem 20 as shown.

Received in the upper part of fork stem or steering tube 20 is the snugly fitting stem 30 of the handle bar unit 14, such handle bar stem being provided with the beveled lower end 31 which cooperates with the beveled upper end 32 of a wedging member 33 when elongated bolt 34 is tightened, with wedging member 33 acting as its nut to retain the handle bar stem at any appropriate adjustment with respect to fork stem or steering tube 20.

Stem or tube 20 is shown as being provided at its upper end with a conventional hex nut 35 and its washer 36.

If desired, the lower end of stem or tube 20 may be provided with a bridge or insert 37, receiving the screw 38 and lending support to a conventional front wheel mud guard 13.

The parts thus far described need not differ materially from corresponding parts heretofore commonly employed in bicycle construction. I shall now proceed with a description of the salient features of novelty which characterize the present invention.

At 40 is shown a plate, preferably in the form of a heavy metal stamping, provided intermediate its ends with a relatively large aperture 41 and at its ends with the smaller apertures 42. Such plate is also provided with a pair of spaced apart upwardly inclined lugs 43, which are apertured at 44. (See Fig. 6.)

Plate 40, with its lugs 43 forwardly presented, is disposed between washer 36 and ring nut 29 with the aperture 41 receiving the upper end of the fork stem or steering tube 20. The lugs 43 of plate 40 are attached to the upper ends of brace tubes 45. Into the upper end of each brace tube is threaded a short stem 46 which extends through the aperture of one of the lugs 43 for cooperation with the cap nut 47. The lower ends of the brace tubes are flattened, as at 48, and are apertured for cooperation with the axle of wheel 12.

Rising from the rugged fitting 18 are integral upward extensions 49 of the fork members 15, each of such extensions receiving at its upper end a threaded stem 50 which extends through one of the apertures 42 of plate 40 for cooperation with a cap nut 51.

The herein described means afford what aptly may be termed a heavy duty fork structure. In this heavy duty fork structure, having its stem or steering tube 20 constituting the intermediate one of three substantially parallel tubular members which are tied together at both the lower end of such stem (by fitting 18) and at the upper end of such stem (by plate 40) there is practically no chance of such stem being bent out of proper relationship to fitting 18, as the stems of conventional front fork constructions were so frequently bent out of proper relationship to the fork member crowns thereof.

It is significant that the advantages of the present invention are obtained without in any way interfering with the adjustability of the stem of the handle bar unit and without in any way preventing such manipulation of the steering head ball bearing tightener (ring nut 29) as may be necessary from time to time.

An incidental advantage of the present invention also resides in the fact that the fork member extensions 49, extending as they do alongside of and in spaced relation to steering head 11, together with plate 40, and the brace tubes 45 extending from the top of the steering head to the front wheel axle, impart to the front portion of the bicycle a pleasing appearance of strength, as well as actual strength, without incorporating any inordinate amount of added metal into the front fork structure.

What I claim is new and desire to secure by Letters Patent of the United States is:

A bicycle comprising in combination a steering head, a fork member, a cross member to which said fork member is attached and from which it extends downwardly to the axle of a wheel disposed between such fork member, said cross member being disposed immediately beneath the steering head and being rigidly attached to the lower end of a steering tube which extends upwardly through said steering head, an adjustable steering post, the lower end of which is adapted to telescope within said steering tube, a second cross member disposed above the steering head and secured to the upper end of such steering tube, said second cross member comprising an elongated plate having three substantially aligned apertures the intermediate of which is secured on the upper end of said steering tube and said member being formed with a forwardly extending bifurcated portion, extensions of said fork member rising from said first cross member and being secured in the outer of said apertures in said second cross member, and a pair of brace rods, each of said brace rods having its upper end attached to a bifurcated portion of said second cross member and having its lower end apertured to receive the axle of the wheel.

FRANK W. SCHWINN.